UNITED STATES PATENT OFFICE.

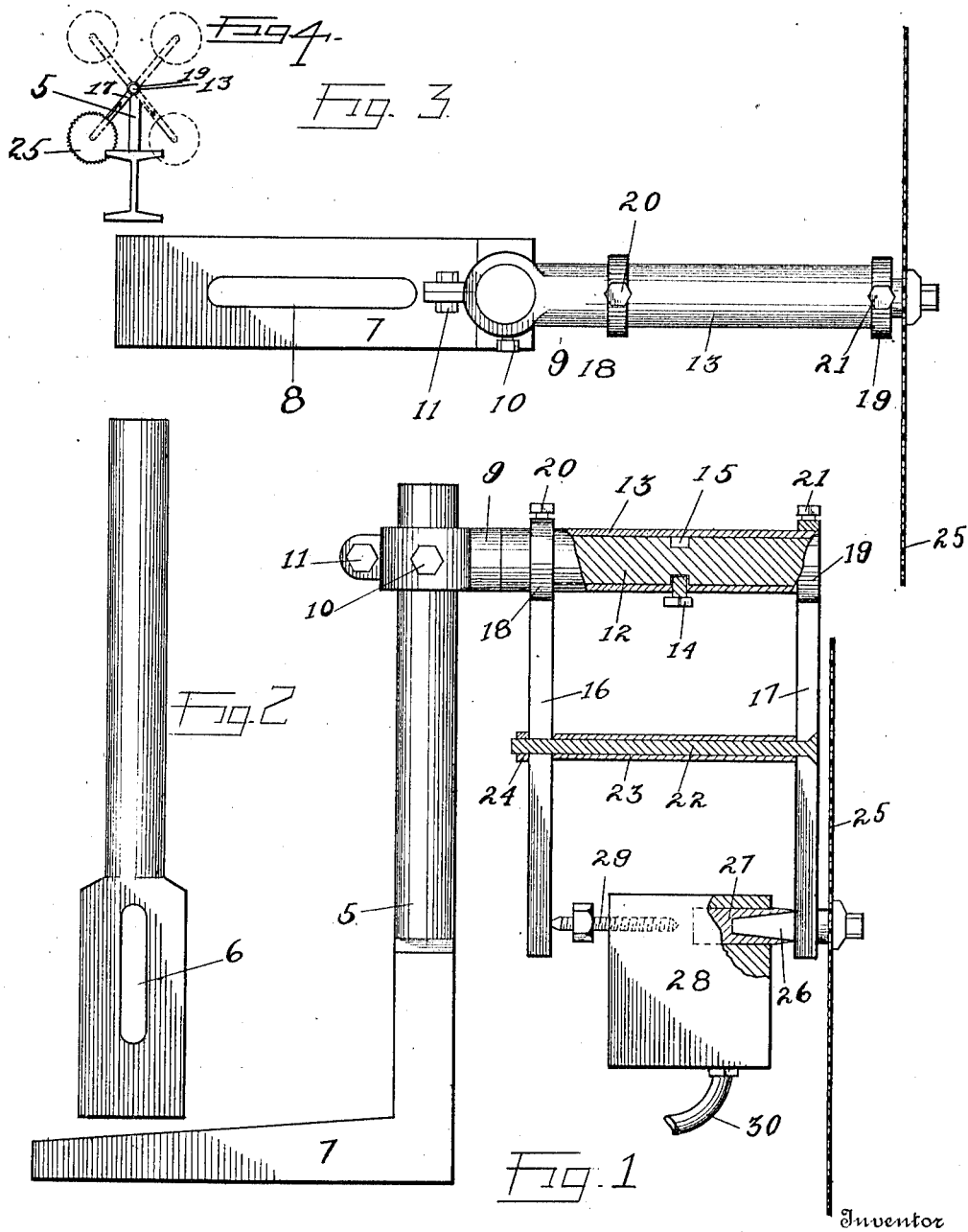

WILLIAM L. HOPKINS, OF NEW YORK, N. Y.

PORTABLE POWER-SAW.

1,061,381.  Specification of Letters Patent.  Patented May 13, 1913.

Application filed May 17, 1911. Serial No. 627,788.

*To all whom it may concern:*

Be it known that I, WILLIAM L. HOPKINS, a citizen of the United States of America, residing at New York, in the county of New York and State of New York, have invented certain new and useful Improvements in Portable Power-Saws, of which the following is a specification.

This invention relates to portable power saws.

In the handling of structural steel, it is very frequently necessary to saw the steel shapes in the field or where a building or other structure is in course of erection.

Compressed air tools of various kinds are at present well known and among them are compressed air reamers through the medium of which rotation may be imparted to a reamer or like tool.

It is an object of the present invention to provide a support for a circular saw adapted to cut structural steel, said support being designed to carry a saw in such relation to a compressed air reamer that the saw may be driven by the compressed air mechanism ordinarily used for driving the reaming tool.

It is also an object of the invention to provide a structure of this character in which the saw will have a bodily swinging movement so that it may be brought into engagement with the work.

It is a further object of the invention to provide a support for the saw of such nature that it may be clamped in position to make either a vertical or a horizontal cut.

A still further object of the invention is the provision of a frame of the character above set forth adapted to support the saw in position to make cuts at varying angles.

Further objects and advantages of the invention will be set forth in the detailed description which now follows.

In the accompanying drawing, Figure 1 is a side view, partly in section, of a saw supporting frame constructed in accordance with the invention, Fig. 2 is an inner face view of a supporting standard hereinafter described, and Fig. 3 is a plan view and Fig. 4 is a diagrammatic view showing the saw swung to two different positions.

Like numerals designate corresponding parts in all of the figures of the drawing.

Referring to the drawing, the numeral 5 designates a supporting standard provided, adjacent its lower end, with a vertical slot 6 and provided at its lower end with a rearwardly extending foot 7 in which a slot 8 is formed. These slots are for the reception of bolts (not shown) adapted to clamp the standard in position, the slot 6 permitting the standard to be clamped upon any suitable support when it is desired to make a horizontal cut with the saw and the slot 8 serving a like purpose when it is desired to make a vertical cut with the saw.

The standard 5 has an arm 9 clamped upon its upper end by means of a set screw 10 and binding screw 11, this arm having a reduced outer end 12 over which a sleeve 13 is slipped, this sleeve being held against accidental displacement from said arm by a screw 14. This screw passes through the sleeve and enters a groove 15 formed in the reduced end 12 of the arm.

Swinging bars 16 and 17 have their upper ends formed with annular portions 18 and 19 which embrace the sleeve 13 and are bound upon said sleeve by set screws 20 and 21. A bolt 22 extends between and through these bars, said bolt passing through a spacing sleeve 23 by which the bars are held in separated relation. A nut 24 draws the bars firmly against the ends of the spacing sleeve and rigidly braces the structure.

A circular saw 25 is mounted upon the outer end of a taper shank 26 and has its bearing in the lower end of the swinging bar 17. This taper shank engages with the rotative member 27 of a compressed air reamer driving device 28. These compressed air reaming machines are well known in the art and the specific structure forms no part of the present invention, the reamer driving mechanism 28 being merely diagrammatically illustrated in the drawing. This compressed air driving element is held in position between the bars 16 and 17 by means of a screw 29, which, when rotated to withdraw it from the compressed air driving element body, supports said body in position as will be readily understood.

It is apparent that when compressed air is supplied through the compressed air hose 30 to impart rotation to the member 27, rotation will in turn be imparted to shank 26 and consequently to the saw 25 which is fixedly secured to said shank. Since the arm 9 may swing around the support 5, it follows that the saw may be brought to varying angular positions to make cuts at corresponding angles and since the arm 9 may be raised or lowered upon the standard, it follows that the saw may be correspondingly raised or lowered to bring it to the most advantageous position for the work to be performed.

Since the openings 6 and 8 are provided, it follows that the standard may be secured in position to cause the standard to lie either in a vertical or horizontal plane to thereby cause the saw to make either a vertical or horizontal cut, though even with the standard in a horizontal position, the swinging adjustment of the arm 9 about the standard 5 is still available to secure longitudinally extending cuts at varying angles.

It will be noted that the frame formed by bars 16, 17, bolt 22, and sleeve 23, is a swinging frame. Consequently the saw has a bodily swinging movement to permit it to be moved readily toward and from the work with the certainty that when it has once been withdrawn from the work and again advanced, it will strike in exactly the same place. If it is found that the saw is feeding too fast, the frame may be swung entirely over to bring the saw into contact with the work from the opposite side thereof. When the saw is brought into contact with the work from one side, the members 16 and 17 are in compression, and when the saw is brought into contact with the work from the opposite side, these members are under tension. When the saw is new and sharp, to place the saw in contact with the work in such position that the members 16 and 17 are under compression, makes the saw feed too fast and choke and bind, and if the power is sufficient, breaks the saw. Accordingly, when the saw is sharp, it is preferred to bring it in contact with the work in such position that the members 16 and 17 are under tension, at which time the saw does not feed so fast. After the saw becomes dulled through use, it may be safely used with the members 16 and 17 under compression.

From the foregoing description, it will be seen that I have provided a portable saw comprising a frame adapted to be used in conjunction with the well known compressed air tools already on the market, and adapted, when used in conjunction with said tools, to provide a saw that may be used for field work or directly upon the ground where a building or other structure is being erected and when so used, may be adjusted to any required position.

While the elements herein shown and described are well adapted to serve the purposes for which they are intended, it is to be understood that the invention is not limited to the precise construction set forth, but includes within its purview, such changes as may be made within the scope of the appended claims.

Having described my invention, what I claim is:

1. In a portable power saw, the combination with a supporting standard provided with means for securing said standard in either a vertical or horizontal position, of a transversely extending arm adapted to swing bodily around said standard, a swinging frame adapted to swing entirely around said transverse arm, a power element mounted in said swinging frame and bodily movable therewith, and a circular saw connected to and driven by said power element.

2. In a device of the character described, the combination with a supporting standard provided with means for securing said standard in either a vertical or horizontal position, a transverse arm mounted to bodily slide upon said supporting standard and to bodily swing entirely around said supporting standard, a swinging frame mounted to swing entirely around said transverse arm, a power element mounted in said swinging frame, and a circular saw connected to said power element and driven thereby, substantially as shown and described.

3. In a device of the character described, the combination with a supporting standard comprising a body portion and a foot member, there being a slot formed in the body portion and there being a slot formed in the foot member, of a transverse swinging arm adapted to swing around said standard, means for binding said arm upon said standard, a swinging frame having a swinging movement about said arm, a compressed air power element mounted in said frame, a shank passing through a portion of said frame and engaging said power element, and a circular saw fixedly secured upon said shank.

4. In a device of the character described, the combination with a supporting standard comprising a round body portion and a flat foot portion, there being a vertical and a horizontal slot formed in said standard, of a transversely extending arm having a ring-like portion embracing the round portion of said standard, means traversing said ring-like portion for binding said arm upon said standard, said arm having a reduced outer end, a sleeve encircling said reduced outer end of the arm, means for preventing accidental displacement of said sleeve from said arm, a pair of swinging bars having ring-like upper ends which embrace said sleeve, means traversing said ring-like upper ends for binding said bars in position upon said sleeve, means for spacing said bars apart, and a bolt traversing said bars and said spacing means for binding said bars together.

5. In a device of the character described, the combination with a supporting standard comprising a round body portion and a flat foot portion, there being a vertical and a horizontal slot formed in said standard, of a transversely extending arm having a ring-like portion embracing the round portion of said standard, means traversing said ring-like portion for binding said arm upon said standard, said arm having a reduced outer end, a sleeve encircling said reduced outer end of the arm, means for preventing accidental displacement of said sleeve from said arm, a pair of swinging bars having ring-like upper ends which embrace said sleeve, means traversing said ring-like upper ends for binding said bars in position upon said sleeve, means for spacing said bars apart, a bolt traversing said bars and said spacing means for binding said bars together, a circular saw, a shank upon which said saw is fixedly mounted, said shank passing through and having its bearing in one of said swinging bars, and a power element engaging said shank for imparting movement thereto, said power element being bodily supported between said swinging bars.

I testimony whereof I affix my signature in presence of two witnesses.

WILLIAM L. HOPKINS.

Witnesses:
VALERIE F. HOPKINS,
MARY E. FERGUSON.

Copies of this patent may be obtained for five cents each, by addressing the "Commissioner of Patents, Washington, D. C."